Figure 1:
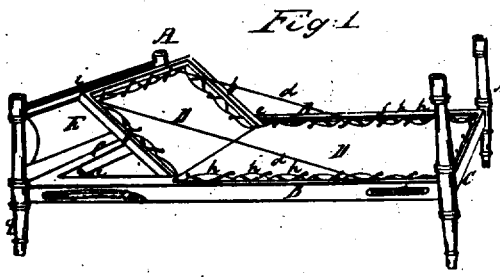
Figure 2:
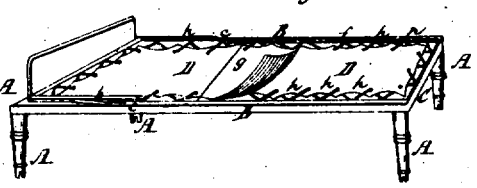
Figure 3:
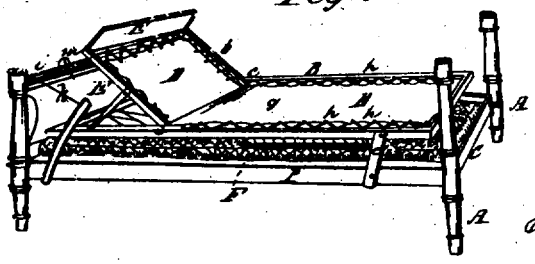
Figure 4:
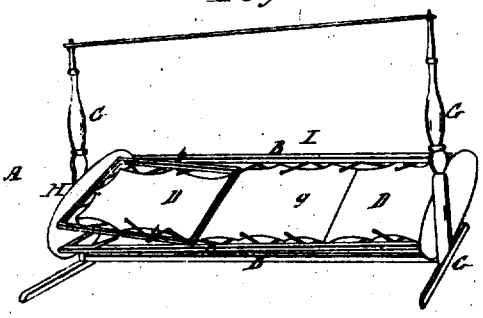
Figure 3:
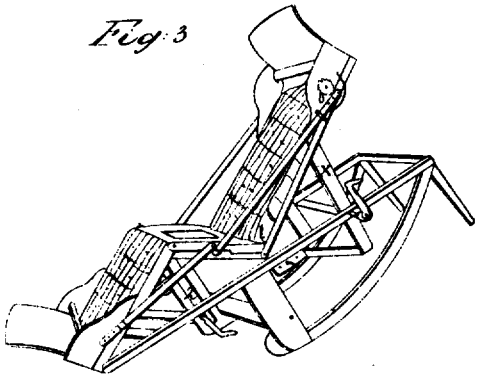
Figure 1:
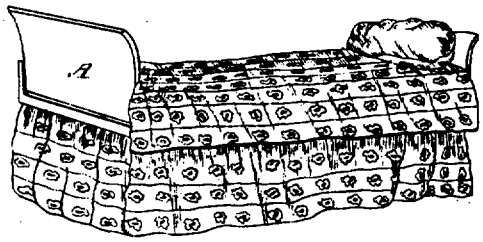
Figure 2:
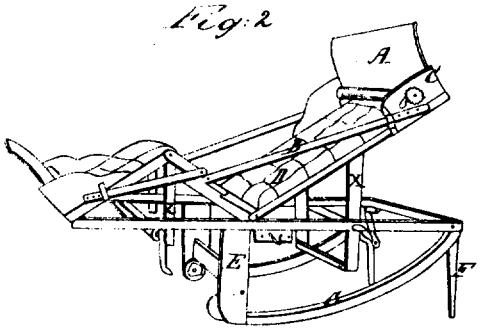
Figure 4:
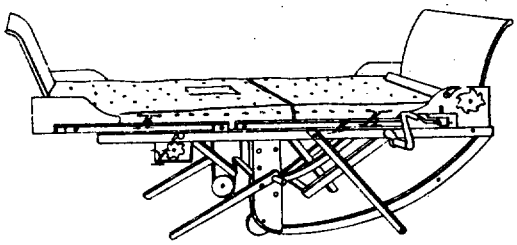
Figure 5:
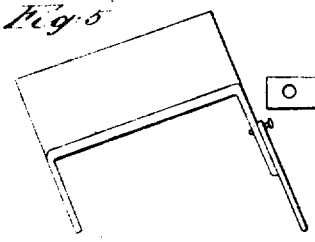
Figure 6:
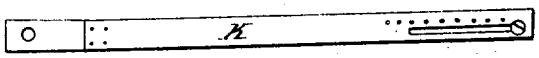
Figure 7:
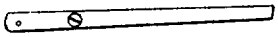

8389X

Sheet 1. 2 Sheets.

W. Woolley,

Invalid Bedstead,

Patented Aug. 30, 1834

Witnesses:
Owen G Warren
Chas Pape

Inventor:
William Woolley

W. Woolley,

Invalid Bedstead,

Patented Aug. 30, 1834.

Witnesses:
Oscar G. Warren
Chas Page

Inventor:
William Woolley

8389x Aug 30, 1834 [illegible]

* Williams Woolley of New York City

Letters Patent

The Schedule referred to in these Letters Patent and making part of the same containing a description in the words of the said Williams Woolley himself of his improvements in Bedsteads designed for the use of the sick and disabled and also for ordinary use.

To all to whom these presents shall come

Be it known that I, Williams Woolley, of the City County and State of New York, have invented a new and useful improvement in Bedsteads designed for the use of the sick and disabled & also for ordinary use. of which the following is a full and exact description Viz. A Bedstead is made similar to the ordinary four post Bedstead now in use except as follows. the sides and ends are first framed together, by morticing the side pieces or bars into the end pieces or bars. the end pieces are then let into the posts by a mortice and tenon, and may be taken out when the bedstead is to be taken down, and thus making but one mortice in each post and saving four bolts. Braces are placed in each corner of this frame to strengthen it, by which the frame may be made lighter than it otherwise could be, and also to furnish at the head of the bed a resting place for the part which is to be raised as herein after described.

Within this frame at the head of it is a smaller frame the ends of which at a little more than one third the whole length from the head of the bed are attached to the sides of the outer frame by screws or bolts on which the inner frame turns, and may be raised and lowered. At the head of the bed, this inner frame rests on the braces before mentioned. This inner frame is raised and kept at any required angle of elevation by means of cords on each side of and fastened at the upper end of it, and also fastened [illegible] any convenient distance on the sides of the outer frame, or by means of supports underneath it made of wood

* Additional improvement added, 22nd February 1838.

or metal they latter being preferable, and which catch in a rack
on the outer frame of the Bedstead. A rabit is made on the
inside of the outer frame at the foot of it, and also on the side pieces
up to the inner frame; and along this rabit at proper distances
are placed the bed pins: a rabet is also made in like manner
on the inside of the inner frame, and bed pinz placed on the end
of it at the head of the bed. These pinz may be of wood as is
usual, but are better if made of cast iron, by which improve-
ment the bed is less exposed to be infested with bugs. A sack-
ing made much in the usual manner is put in and fastened by
a bed cord to the pinz at the foot. By a separate bed cord at
each side of the outer frame, and another separate bed cord
at the head of the bed on the inner frame, and by a small cord
on each side of the inner frame, passing through two holes
in the sacking, and through the sides of the inner frame.
The advantage of having these cords distinct from each other
is to keep the sacking tight when the head is raised. When the
head piece is lowered it acts as a lever on the whole sacking,
and keeps it perfectly tight: The head board for purposes hereaf-
ter explained should be a straight line on the top of it. Over the
head board and close to it, is a roller, the ends of which are let in to
the head posts by a round tenon and mortice so as to admit of be-
ing turned by a crank which is let into one end of it through
one of the head posts, and which crank when not in use is taken
off. This roller when the bedstead is for ordinary use, is merely
an ornament, but may be used with the aid of cords to raise the
inner frame, and is chiefly designed for the uses hereafter descri
bed. Near the head and foot of the bedstead, and on each side
of the outer frame are fastened by bolts or screws two levers for the
purposes hereafter described. This Bedstead as thus far described
is represented by drawing number one, hereunto annexed: and in
this state may be used, and is intended as an improved bedstead
for common use, and possesses all the advantages of the bed chair
much improved A frame iz made az before described. with an inner frame also az before described. This frame rests upon feet which are screwed in and easily taken out. A head board iz made to let in and take out of the head of the inner frame; in the usual manner of cot Bed steadz. A Sacking about two thirds the length of the Bed stead iz put in at the foot part of the Bedstead in the same manner az that before described; except that the upper end of it iz attached by cordz running thro' it to the head piece of the outer frame. In this sacking near the upper end of it iz an aperture under which when required may be placed a bed pan. Another Sacking iz fastened into the inner frame, in the same manner az before described. which latter sacking extendz about two thirds the length of the Bedstead; and lapz over the other sacking so az to cover the aperture above mentioned, and the two pieces of sacking are sewed together just above the aperture. This bedstead thus far described formz an improved cot bedstead for ordinary use, and a chair bedstead. and both of the bedsteadz above described; will also be found sufficient for most cases of sicknesz or fractured limbz.

This bedstead last described iz represented by drawing number two, hereunto annexed. The two bedsteadz above described are combined and used together in the following manner. The foot and the head board are taken out of the improved cot bedstead and it iz placed on the mattrasz or bed upon the other Bedstead one end of each of the two leverz above mentioned, next to the foot of the bed, iz fastened by a bolt or screw to the sides of the cot bed stead, so az to allow the leverz to turn; and the leverz at the head are fastened to the cot-bedstead in like manner by boltz or screwz. at equal distance with those at the foot. To the upper end of each of the last mentioned leverz which are extended to give a purchase, iz fastened a cord which passez through and iz fastened to the roller at the head of the bedstead first above described. By turning the crank before mentioned, the cot bedstead iz raised and kept in a horizontal position to any height... which the length of the 8389X 8-30-1834 levers permits and the patient requires, and when raised is held by a pin passing through the roller against the head board or other convenient mode. The patient who is placed on the upper bedstead is thus raised without effort on his part or moving him in the least from his position and when thus raised the Bed underneath can be changed or made; the bed pan can be used if needed and other changes can be made which the situation of the patient may require; that the bed pan may be used with more convenience, an oiled silk or painted canvass is fastened to a frame of convenient size being left loose in the centre into which the bed pan can be placed when used. This combination as above described is represented in the drawing number three hereunto annexed.

A fourth improvement in this Bedstead or mode of using it; is made by the use of the improved cot Bedstead, above described in the following man manner, the feet and the head board are taken out and it is fastened by screws at each end; into a frame similar to the frame of a swing cradle and in which it can be made to swing or rock when necessary, this frame for convenience should be on rollers. a part of this frame is a board at each end of the bedstead, into which the bedstead is fastened and which swings with it. The bed may be kept horizontal or in any inclined position that may be required, by passing a pin or bolt through the upright posts on which the bedstead swings into the boards at the head and foot above described. for which purpose holes are made in the boards at suitable distances. When it is required to turn the patient on to one side for surgical treatment, or to change the bed or the position of the patient, in any manner, a slab or board of the length of the bed and about eighteen inches wide, is fastened to either side of the bed by hooks, or in any other convenient manner. By this means when the Bed is inclined, a resting place is provided for the patient, and all necessary surgical treatment, dressing of wounds, and the like may be attended to, without disturbing the patient, and in a much more convenient manner, and all required changes in the bed can be made. This Bedstead last described is represented by the drawing number four hereunto annexed.

The improvements above described are adapted to the use of the sick;

infirm and disabled under all circumstances and especially to the use of Hospitals. and other similar establishments. They greatly promote the comfort and quiet of the patient. and enable the nurse, physician or surgeon to render the services necessary with much greater ease, to themselves and to the patient; at the same time they serve when separated. as improved Bedsteads for common use. and by being capable of use when separated: and also of being combined in the different modes above described, the advantages of four different kinds of Bedsteads for the sick to be used as occasion requires are attained by having only two which at the same time are also suited for common use. and thus much expense as well as room .... is saved. I claim as my invention and improvement, the combination and union of the two Bedsteads first above described into one. forming that which is represented by drawing number three in the manner above set forth; which improvement was made by me in January last, and has been perfected by various experiments since that time, and also the above described mode of combining the said improved cot bedstead. with the frame and other parts so as to form that represented in drawing number four. whereby it admits of being rocked. and also inclined to either side without removing the patient.

I also claim the foregoing improvements, in number one, by which the frame is fastened to the posts by one mortice in each; and may be taken out of the posts without being separated, thereby leaving room for the action of the said levers. and by which means said frame when taken from the posts may be used in lieu of the frame of the improved Cot Bedstead. and other useful objects are gained. And also the modes of adapting and fastening and tightening the sacking above described. as applied to the foregoing improved Bedsteads. In witness whereof I have hereunto set my hand at the City of New York this seventh day of August in the year one thousand Eight Hundred and thirty four.

Witnesses
Geo. C. Goddard
J. M. Van Cott

Drawing William Woolley. Ex'd My.

(2080 words) (See Additional Letters Patent No 3. Recorded in Volume No 1. of additional Improvements page 1. — granted Feb. 22, 1835).